(12) United States Patent
Jayaramachar et al.

(10) Patent No.: US 11,849,506 B2
(45) Date of Patent: Dec. 19, 2023

(54) METHODS, SYSTEMS, AND COMPUTER READABLE MEDIA FOR ROUTING INTER-PUBLIC LAND MOBILE NETWORK (INTER-PLMN) MESSAGES RELATED TO EXISTING SUBSCRIPTIONS WITH NETWORK FUNCTION (NF) REPOSITORY FUNCTION (NRF) USING SECURITY EDGE PROTECTION PROXY (SEPP)

(71) Applicant: Oracle International Corporation, Redwood Shores, CA (US)

(72) Inventors: Amarnath Jayaramachar, Bangalore (IN); Jay Rajput, Bangalore (IN); Virendra Singh, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 106 days.

(21) Appl. No.: 17/497,879

(22) Filed: Oct. 8, 2021

(65) Prior Publication Data

US 2023/0110286 A1 Apr. 13, 2023

(51) Int. Cl.
*H04W 8/02* (2009.01)
*H04W 48/16* (2009.01)
(Continued)

(52) U.S. Cl.
CPC ......... *H04W 8/183* (2013.01); *H04L 61/4511* (2022.05); *H04W 8/20* (2013.01); *H04W 84/042* (2013.01)

(58) Field of Classification Search
None
See application file for complete search history.

(56) References Cited

U.S. PATENT DOCUMENTS 6,725,278 B1 4/2004 Gonzalez
6,748,435 B1 6/2004 Wang et al.
(Continued)

FOREIGN PATENT DOCUMENTS

CN 101366311 A 2/2009
CN 101512971 A 8/2009
(Continued)

OTHER PUBLICATIONS

"3rd Generation Partnership Project; Technical Specification Group Core Network and Terminals; Numbering, addressing and identification; (Release 17)," 3GPP TS 23.003, V17.3.0, pp. 1-145 (Sep. 2021).
(Continued)

*Primary Examiner* — Gary Lafontant
(74) *Attorney, Agent, or Firm* — Jenkins, Taylor & Hunt, P.A.

(57) ABSTRACT

A method for routing inter-public land mobile network (inter-PLMN) messages relating to existing subscriptions with a network function (NF) repository functions (NRFs) includes, at a security edge protection proxy (SEPP) implemented using at least one processor, automatically populating, by the SEPP, a subscription identifier to target NRF resource identification information mapping database accessible to the SEPP with mappings between subscription identifiers and target NRF resource identification information. The method further includes receiving an inter-PLMN message for modifying or deleting a subscription. The method further includes reading a subscription identifier from the message for modifying or deleting the subscription. The method further includes using the subscription identifier from the message for modifying or deleting the subscription to access the database and obtain an identifier associated with an NRF that created the subscription. The method
(Continued)

further includes forwarding the message for updating or deleting the subscription to the NRF.

20 Claims, 12 Drawing Sheets

(51) Int. Cl.
  *H04W 8/18* (2009.01)
  *H04W 8/20* (2009.01)
  *H04L 61/4511* (2022.01)
  *H04W 84/04* (2009.01)

(56) References Cited

U.S. PATENT DOCUMENTS

| | | |
|---|---|---|
| 7,151,945 B2 | 12/2006 | Myles et al. |
| 7,706,822 B2 | 4/2010 | Emeott et al. |
| 8,306,034 B2 | 11/2012 | Jang et al. |
| 8,620,858 B2 | 12/2013 | Backholm et al. |
| 8,767,705 B2 | 7/2014 | Göppner et al. |
| 8,811,228 B2 | 8/2014 | Lopez et al. |
| 8,811,372 B2 | 8/2014 | Li et al. |
| 8,824,449 B2 | 9/2014 | van der Wateren et al. |
| 9,124,537 B2 | 9/2015 | Kolze |
| 9,246,762 B1 | 1/2016 | Watkins |
| 9,386,551 B2 | 7/2016 | Zhou et al. |
| 9,667,590 B2 | 5/2017 | Yan et al. |
| 10,097,504 B2 | 10/2018 | Backholm |
| 10,299,128 B1 | 5/2019 | Suthar et al. |
| 10,361,843 B1 | 7/2019 | Suthar et al. |
| 10,595,256 B1 | 3/2020 | Marupaduga et al. |
| 10,616,934 B2 | 4/2020 | Talebi Fard et al. |
| 10,637,753 B1 | 4/2020 | Taft et al. |
| 10,772,062 B1 | 9/2020 | Albasheir et al. |
| 10,778,527 B2 | 9/2020 | Assali et al. |
| 10,791,044 B1 | 9/2020 | Krishan et al. |
| 11,224,009 B2 | 1/2022 | Krishan |
| 11,290,549 B2 | 3/2022 | Krishan |
| 11,470,544 B2 | 10/2022 | Singh et al. |
| 11,483,694 B2 | 10/2022 | Krishan |
| 11,528,334 B2 | 12/2022 | Krishan et al. |
| 2004/0062278 A1 | 4/2004 | Hadzic et al. |
| 2004/0208183 A1 | 10/2004 | Balachandran et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2007/0242738 A1 | 10/2007 | Park et al. |
| 2008/0165761 A1 | 7/2008 | Goppner et al. |
| 2009/0006652 A1 | 1/2009 | Kasatani |
| 2009/0024727 A1 | 1/2009 | Jeon et al. |
| 2009/0055835 A1 | 2/2009 | Zhu |
| 2009/0141625 A1 | 6/2009 | Ghai et al. |
| 2009/0222584 A1 | 9/2009 | Josefsberg et al. |
| 2011/0078674 A1 | 3/2011 | Ershov |
| 2011/0202604 A1 | 8/2011 | Craig et al. |
| 2013/0029708 A1 | 1/2013 | Fox et al. |
| 2014/0075004 A1 | 3/2014 | Van Dusen et al. |
| 2014/0349694 A1 | 11/2014 | Raghothaman et al. |
| 2014/0379901 A1 | 12/2014 | Tseitlin et al. |
| 2015/0039560 A1 | 2/2015 | Barker et al. |
| 2015/0071074 A1 | 3/2015 | Zaidi et al. |
| 2016/0156513 A1 | 6/2016 | Zhang et al. |
| 2016/0183156 A1 | 6/2016 | Chin et al. |
| 2016/0344635 A1 | 11/2016 | Lee et al. |
| 2016/0350683 A1 | 12/2016 | Bester et al. |
| 2016/0352588 A1 | 12/2016 | Subbarayan et al. |
| 2016/0380906 A1 | 12/2016 | Hodique et al. |
| 2017/0221015 A1 | 8/2017 | June et al. |
| 2018/0039494 A1 | 2/2018 | Lander et al. |
| 2018/0083882 A1 | 3/2018 | Krishan et al. |
| 2018/0213391 A1 | 7/2018 | Inoue |
| 2018/0262592 A1 | 9/2018 | Zandi et al. |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0261244 A1 | 8/2019 | Jung et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0008069 A1 | 1/2020 | Zhu et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0127916 A1 | 4/2020 | Krishan |
| 2020/0137174 A1 | 4/2020 | Stammers et al. |
| 2020/0404608 A1 | 12/2020 | Albasheir et al. |
| 2021/0007023 A1 | 1/2021 | Umapathy et al. |
| 2021/0044481 A1 | 2/2021 | Xu et al. |
| 2021/0204200 A1 | 7/2021 | Krishan et al. |
| 2021/0385286 A1 | 12/2021 | Wang et al. |
| 2022/0015023 A1 | 1/2022 | De-Gregorio-Rodriguez et al. |
| 2022/0060547 A1 | 2/2022 | Krishan |
| 2022/0070648 A1 | 3/2022 | Krishan |
| 2022/0240171 A1 | 7/2022 | Singh |
| 2023/0042219 A1 | 2/2023 | Singh et al. |
| 2023/0099468 A1* | 3/2023 | Khare .................. H04W 8/18 455/432.1 |
| 2023/0188972 A1 | 6/2023 | Goel et al. |

FOREIGN PATENT DOCUMENTS

| | | |
|---|---|---|
| CN | 105635345 B | 2/2019 |
| CN | 114930902 A | 8/2022 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/138074 A1 | 7/2021 |
| WO | WO 2022/046170 A1 | 3/2022 |
| WO | WO 2022/050987 A1 | 3/2022 |

OTHER PUBLICATIONS

Commonly-Assigned, co-pending U.S. Appl. No. 17/392,288 for "Methods, Systems, and Computer Readable Media for Optimized Routing of Service Based Interface (SBI) Request Messages to

(56) References Cited

OTHER PUBLICATIONS

Remote Network Function (NF) Repository Functions Using Indirect Communications via Service Communications Proxy (SCP)," (Unpublished, filed Aug. 3, 2021).
"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Non-Final Office Action for U.S. Appl. No. 17/392,288 (dated Apr. 5, 2023).
Commonly-Assigned, co-pending U.S. Appl. No. 17/746,895 for Methods, Systems, and Computer Readable Media for Facilitating Processing of Inter-Public Land Mobile Network (PLMN) Messages Related to Existing Subscriptions, (Unpublished, filed May 17, 2022).
"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).
Notice of Allowance for U.S. Appl. No. 17/156,149 (dated May 24, 2022).
Notice of Allowance for U.S. Appl. No. 17/156,149 (dated Apr. 19, 2022).
Commonly-Assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).
Communication of European Publication Number and Information on the Application of Article 67(3) EPC for European Patent Application Serial No. 20842464.8 (dated Oct. 12, 2022).
First Examination Report for Indian Patent Application Serial No. 202224703624 (dated Nov. 17, 2022).
Notification to Grant Patent Right for Chinese Patent Application Serial No. 201980067968.7 (dated Aug. 25, 2022).
Notice of Allowance for U.S. Appl. No. 17/009,725 (dated Jun. 13, 2022).
Non-Final Office Action for Chinese Patent Application Serial No. 201980067968.7 (dated Mar. 3, 2022).
First Examination Report for Indian Patent Application Serial No. 202147011137 (dated Mar. 9, 2022).
Non-Final Office Action for U.S. Appl. No. 17/082,871 (dated Feb. 7, 2022).
Commonly-assigned, co-pending U.S. Appl. No. 17/481,004 for Methods, Systems, and Computer Readable Media for Providing for Optimized Service-Bases Interface (SBI) Communications by Preforming Network Function (NF) Fully Qualified Domain Name (FQDN) Resolution at NF Repository Function (NRF) (Unpublished, filed Oct. 1, 2021).
Notice of Allowance and Fee(s) Due for U.S. Appl. No. 17/001,599 (dated Nov. 17, 2021).
Notification of Transmittal of the International Search Report and the Written Opinion of the International Searching Authority, or the Declaration for International Application No. PCT/US2021/033031 (dated Sep. 16, 2021).
Notice of Allowance and Fee(s) Due for U.S. Appl. No. 16/356,446 (dated Sep. 30, 2021).
Non-Final Office Action for U.S. Appl. No. 16/945,794 (dated Sep. 15, 2021).
Notice of Allowance and Fee(s) Due for U.S. Appl. No. 16/730,799 (dated Aug. 16, 2021).
Communication of European publication Number and information on the application of Article 67(3) EPC for European Patent Application Serial No. 19791391.6 (dated Aug. 11, 2021).
Notice of Allowance and Fee(s) Due for U.S. Appl. No. 16/730,799 (dated Jul. 30, 2021).
Notification of Transmittal of the International Search Report and the Written Opinion of the International Searching Authority, or the Declaration for International Application No. PCT/US2021/024000 (dated Jun. 24, 2021).
Notification of Transmittal of the International Search Report and the Written Opinion of the International Searching Authority, or the Declaration for U.S. Patent Application Serial No. PCT/US2021/020120 (dated Jun. 1, 2021).
Notification of Transmittal of the International Search Report and the Written Opinion of the International Searching Authority, or the Declaration for U.S. Patent Application Serial No. PCT/US2021/020122 (Jun. 1, 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
Nokia et al., "Discussion paper on authorization for Model D Indirect communications", 3GPP TSG SA WG3; S3-194380 (Nov. 11, 2019).
Non-Final Office Action for U.S. Appl. No. 16/356,446 (dated Jun. 16, 2021).
Notice of Allowance and Fee(s) Due for U.S. Appl. No. 17/001,599 (dated May 17, 2021).
Applicant-Initiated Interview Summary for U.S. Appl. No. 17/001,599 (dated May 5, 2021).
Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (Apr. 7, 2021).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Cheshire, S. et al., "Apple's DNS Long-Lived Queries protocol draft-sekar-dns-llq-06," Internet Engineering Task Force (IETF), pp. 1-26 (Aug. 23, 2019).
Advisory Action for U.S. Appl. No. 16/356,446 (dated Dec. 22, 2020).
Notice of Allowance and Fee(s) Due for U.S. Appl. No. 16/555,817 (dated Dec. 3, 2020).
Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-assigned, co-pending U.S. Appl. No. 17/082,871 for "Methods, Systems, and Computer Readable Media for Rank Processing for Network Function Selection," (Unpublished, filed Oct. 28, 2020).
Commonly-assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).
"P-GW Administration Guide, StarOS Release 21.20," Cisco, pp. 1-1164 (Oct. 11, 2020).
"3rd Generation Partnership Project; Technical Specification Group Core Network and Terminals; Non-Access-Stratum (NAS) protocol

(56) References Cited

OTHER PUBLICATIONS for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Non-Final Office Action for U.S. Appl. No. 16/697,021 (dated Sep. 29, 2020).
Notice of Allowance and Fee(s) Due for U.S. Appl. No. 16/527,988 (dated Sep. 17, 2020).
Final Office Action for U.S. Appl. No. 16/356,446 (dated Sep. 8, 2020).
Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-assigned, co-pending U.S. Appl. No. 17/001,599 for "Methods, Systems, and Computer Readable Media for Optimized Network Function (NF) Discovery and Routing Using Service Communications Proxy (SCP) And NF Repository Function (NRF)," (Unpublished, filed Aug. 24, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
Ex Parte Quayle Action for U.S. Appl. No. 16/527,988 (Jun. 1, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Notification of Transmittal of the International Search Report and the Written Opinion of the International Searching Authority, or the Declaration for International Application Serial No. PCT/US2019/053912 (dated Dec. 18, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).

"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Commonly-Assigned, co-pending U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
Huawei, "eSBA: reselection of producer instance," 3GPP TSG-SA2 Meeting #132, pp. 1-2 (Apr. 12, 2019).
Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Commonly-assigned, co-pending U.S. Appl. No. 16/356,446 for "Methods, Systems, and Computer Readable Media For Locality-Based Selection and Routing of Traffic to Producer Network Functions (NFs)," (Unpublished, filed Mar. 18, 2019).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
Docomo, "Update Solution 4 for implicit registration," SA WG2 Meeting #129, pp. 1-2 (Oct. 15-19, 2018).

(56) References Cited

OTHER PUBLICATIONS

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Mayer, "RESTful APIs for the 5G Service Based Architecture," Journal of ICT, vol. 6_1&2, pp. 101-116 (2018).
"5G Service Based Architecture (SBA)," 5G, pp. 1-61 (downloaded Dec. 24, 2018).
Scholl et al., "An API First Approach to Microservices Development," Oracle, https://blogs.oracle.com/developers/an-api-first-approach-to-microservices-development, pp. 1-12 (Nov. 8, 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
"Implementing Quality of Service Policies with DSCP," Cisco, pp. 1-7 (Feb. 15, 2008).
Nichols et al., "Definition of the Differentiated Services Field (DS Field) in the IPv4 and IPv6 Headers," Internet Engineering Task Force (IETF) Network Working Group Request for Comments (RFC) 2474, The Internet Society, pp. 1-20 (Dec. 1998).
Notice of Allowance for U.S. Appl. No. 17/392,288 (dated Jul. 27, 2023).

* cited by examiner

METHODS, SYSTEMS, AND COMPUTER READABLE MEDIA FOR ROUTING INTER-PUBLIC LAND MOBILE NETWORK (INTER-PLMN) MESSAGES RELATED TO EXISTING SUBSCRIPTIONS WITH NETWORK FUNCTION (NF) REPOSITORY FUNCTION (NRF) USING SECURITY EDGE PROTECTION PROXY (SEPP)

TECHNICAL FIELD

The subject matter described herein relates to routing inter-PLMN messages relating to existing subscriptions. More particularly, the subject matter described herein relates to using an SEPP to route inter-PLMN messages relating to existing subscriptions with an NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G networks is that routing information may be lost for inter-PLMN messages relating to existing subscriptions with an NRF when NRFs are deployed in different regions of a PLMN and intermediate forwarding is implemented. For example, when an inter-PLMN message for creating a new subscription arrives at an NRF in a PLMN, if the NRF cannot create the requested subscription, the NRF implements intermediate forwarding and forwards the message to another NRF in a different region of the PLMN. If the target NRF is able to create the subscription, it does so and sends a subscription response message back to the consumer NF in the originating PLMN. The subscription response includes a location header that identifies the target NRF. However, the location header is removed by the NRF in the originating PLMN before forwarding the subscription response to the consumer NF. Accordingly, when the consumer NF sends a message relating to the subscription, the message does not include information that identifies the target NRF in the destination PLMN. Instead, the NRF in the originating PLMN self-constructs an inter-PLMN NRF FQDN that is used in all inter-PLMN subscription requests and does not identify the target NRF. Accordingly, when the originating PLMN forwards the message relating to the subscription to the destination PLMN, there is insufficient information in the message to route the message to the NRF on which the subscription was created.

Accordingly, there exists a need for improved methods, systems and computer readable media for routing inter-PLMN messages relating to existing subscriptions with NRFs in a network that implements intermediate forwarding.

SUMMARY

A method for routing inter-public land mobile network (inter-PLMN) messages relating to existing subscriptions with a network function (NF) repository functions (NRFs), includes, at a security edge protection proxy (SEPP) implemented using at least one processor, automatically populating, by the SEPP, a subscription identifier to target NRF resource identification information mapping database accessible to the SEPP with mappings between subscription identifiers and target NRF resource identification information. The method further includes receiving an inter-PLMN message for modifying or deleting a subscription. The method further includes reading a subscription identifier from the message for modifying or deleting the subscription. The method further includes using the subscription identifier from the message for modifying or deleting the subscription to access the database and obtain an identifier associated with an NRF that created the subscription. The method further includes forwarding the message for updating or deleting the subscription to the NRF.

According to another aspect of the subject matter described herein, automatically populating the subscription identifier to target NRF resource identification information mapping database includes receiving, from the NRF, a subscription creation response message indicating successful creation of the subscription, and reading, from the subscription creation response message, the subscription identifier and the identifier associated with the NRF and storing, in the database, a mapping between the subscription identifier and the identifier associated with the NRF.

According to another aspect of the subject matter described herein, the identifier associated with the NRF comprises a target apiRoot attribute identifying the NRF.

According to another aspect of the subject matter described herein, reading, from the subscription creation response message, the subscription identifier and the identifier associated with an NRF includes reading the target apiRoot attribute from a location header of the subscription creation response message.

According to another aspect of the subject matter described herein, receiving the subscription creation response message includes receiving a 201 Created message indicating successful creation of the subscription.

According to another aspect of the subject matter described herein, receiving the subscription creation response message includes receiving the subscription creation response message from an NRF that is a different NRF to which the SEPP sent a corresponding subscription creation request message.

According to another aspect of the subject matter described herein, receiving the subscription creation response message from the NRF that is different from the NRF to which the SEPP sent the corresponding subscription creation request message includes receiving the subscription creation response message from an NRF that received the corresponding subscription creation request message via intermediate forwarding.

According to another aspect of the subject matter described herein, receiving the inter-PLMN message for updating or deleting the subscription includes receiving a hypertext transfer protocol (HTTP) PATCH request for updating or deleting the subscription.

According to another aspect of the subject matter described herein, the method for routing inter-PLMN subscriptions to an NRF includes identifying the inter-PLMN message for updating or deleting the subscription as a message for updating or deleting the subscription based on an HTTP method type of the message for updating or deleting the subscription.

According to another aspect of the subject matter described herein, the message for updating or deleting the subscription includes receiving a message including an inter-PLMN NRF fully qualified domain name (FQDN) constructed by a visited NRF and wherein forwarding the message incudes forwarding the message using the identifier for the NRF obtained from the database rather than the inter-PLMN NRF FQDN constructed by the visited NRF.

According to another aspect of the subject matter described herein, a system for routing inter-public land mobile network (inter-PLMN) messages relating to existing subscriptions with a network function (NF) repository functions (NRFs) is provided. The system includes a security edge protection proxy (SEPP) including at least one processor and a memory. The system further includes an inter-PLMN subscription message hander implemented by the at least one processor for automatically populating a subscription identifier to target NRF resource identification information mapping database accessible to the SEPP with mappings between subscription identifiers and target NRF resource identification information and storing the database in the memory, receiving an inter-PLMN message for modifying or deleting a subscription, reading a subscription identifier from the message for modifying or deleting the subscription, using the subscription identifier from the message for modifying or deleting the subscription to access the database and obtain an identifier associated with an NRF that created the subscription, and forwarding the message for updating or deleting the subscription to the NRF.

According to another aspect of the subject matter described herein, the inter-PLMN subscription message handler is configured to, in automatically populating the subscription identifier to target NRF resource identification information mapping database: receive, from the NRF, a subscription creation response message indicating successful creation of the subscription; and read, from the subscription creation response message, the subscription identifier and the identifier associated with the NRF and storing, in the database, a mapping between the subscription identifier and the identifier associated with the NRF.

According to another aspect of the subject matter described herein, the identifier associated with the NRF comprises a target apiRoot attribute identifying the NRF.

According to another aspect of the subject matter described herein, the inter-PLMN subscription message handler is configured to read the target apiRoot attribute from a location header of the subscription response message.

According to another aspect of the subject matter described herein, the subscription creation response message includes a 201 Created message indicating successful creation of the subscription.

According to another aspect of the subject matter described herein, the subscription creation response message is received from an NRF that is a different NRF to which the SEPP sent a corresponding subscription creation request message.

According to another aspect of the subject matter described herein, the subscription creation response message is received from an NRF that received the corresponding subscription creation request message via intermediate forwarding.

According to another aspect of the subject matter described herein, the inter-PLMN message for updating or deleting the subscription includes a hypertext transfer protocol (HTTP) PATCH request for updating or deleting the subscription.

According to another aspect of the subject matter described herein, the inter-PLMN message handler is configured to identify the inter-PLMN message for updating or deleting the subscription as a message for updating or deleting the subscription based on an HTTP method type of the message for updating or deleting the subscription.

According to another aspect of the subject matter described herein, a non-transitory computer readable medium having stored thereon executable instructions that when executed by a processor of a computer control the computer to perform steps. The steps are performed at a security edge protection proxy (SEPP). The steps include automatically populating, by the SEPP, a subscription identifier to target network function (NF) repository function (NRF) resource identification information mapping database accessible to the SEPP with mappings between subscription identifiers and target NRF resource identification information. The steps further include receiving an inter-PLMN message for modifying or deleting a subscription. The steps further include reading a subscription identifier from the message for modifying or deleting the subscription. The steps further include using the subscription identifier from the message for modifying or deleting the subscription to access the database and obtain an identifier associated with an NRF that created the subscription. The steps further include forwarding the message for updating or deleting the subscription to the NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
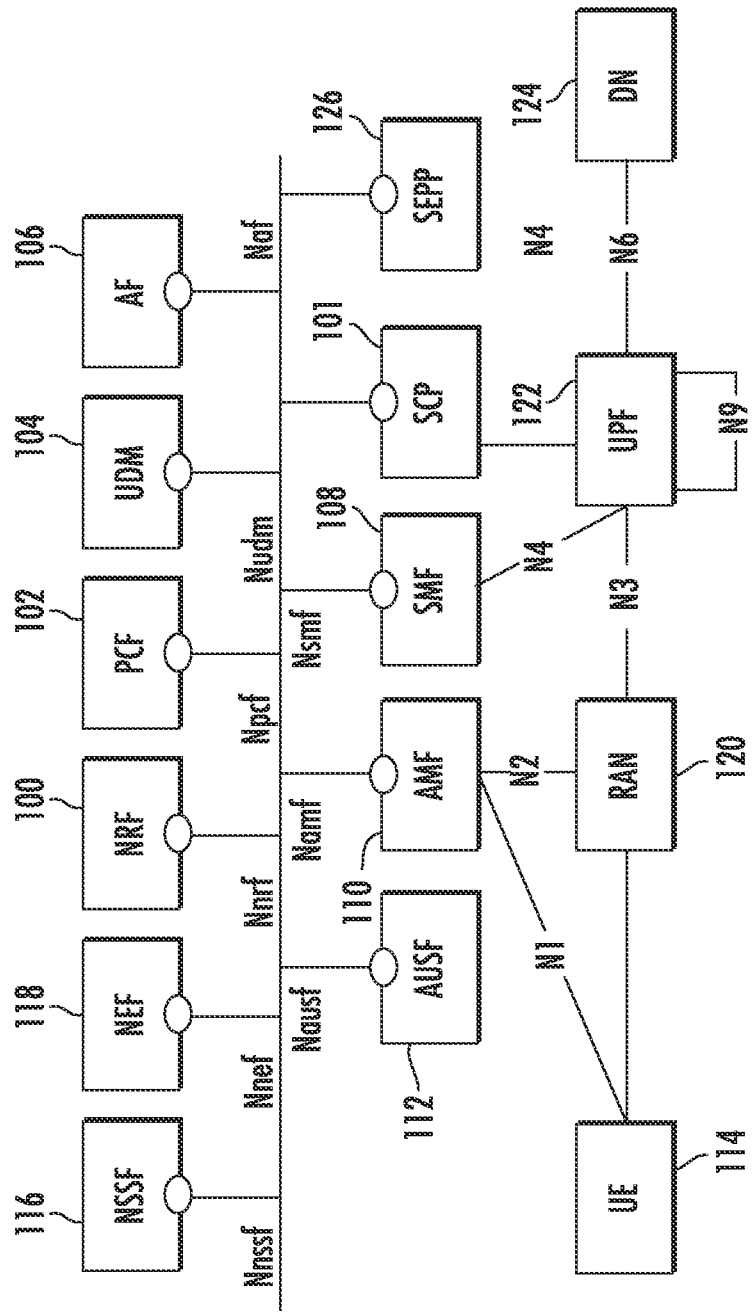
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipments (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is in some network deployments, a PLMN is divided into multiple regions, each with an NRF, and routing information for inter-PLMN messages relating to existing subscriptions is not available. In some network deployments, each region in a PLMN has one logical NRF deployed. The logical NRF deployed in each region may include multiple physical geo-redundant NRFs deployed for high availability. Inter-PLMN Nnrf service requests may be triggered from a visited NRF to a home NRF. The SEPP is used to provide inter-PLMN forwarding functionality between PLMNs. As per 3GPP specifications (3GPP TS 23.003), the NRF from the visited PLMN shall use a self-constructed FQDN of the home NRF, which is in the inter-PLMN format, to route the inter-PLMN Nnrf service request. Hence, as per 3GPP specifications, for one PLMN there can be only one inter-PLMN NRF apiRoot, which the SEPP and other PLMN NRF use for routing the inter-PLMN Nnrf service requests. If the initial subscription request is forwarded to a home NRF which cannot serve the request, then intermediate forwarding functionality (3GPP TS 29.510, Section 5.2.2.5.4) is used to route the request to the target home NRF.

When the target NRF in the home network accepts and processes the subscription request, the target home NRF formulates and sends a success response message to the NRF in the visited network. The success response includes a location header that identifies the target NRF as the NRF that created the subscription. The success response message also includes a subscription identifier that identifies the subscription. However, in processing the success response message, the location header that identifies the target NRF is modified to identify the serving NRF (visited NRF) and the subscriptionID prefixed with a mobile country code and mobile network code (MCC and MNC) (3GPP TS 29.510 Section 5.2.2.5.7). The MCC and MCC prefix plus subscriptionID is required for subsequent request inter-PLMN routing from the visited NRF. In this course of handling, the target NRF's apiRoot information is lost due to the modification of the location header by the visited NRF. Hence, for subsequent messages relating to existing subscriptions, there is no mechanism to route the request to the target home NRF where the resource was created. According to an aspect of the subject matter described herein, it is proposed that the home SEPP (hSEPP) in the home PLMN, shall create a mapping of the subscriptionID to the target NRF's apiRoot during initial subscription creation (response handling). On any subsequent request handling relating to the subscription, the hSEPP derives the target NRF's apiRoot through the locally maintained mapping and routes the Nnrf service request to the target NRF.

Figure 2:
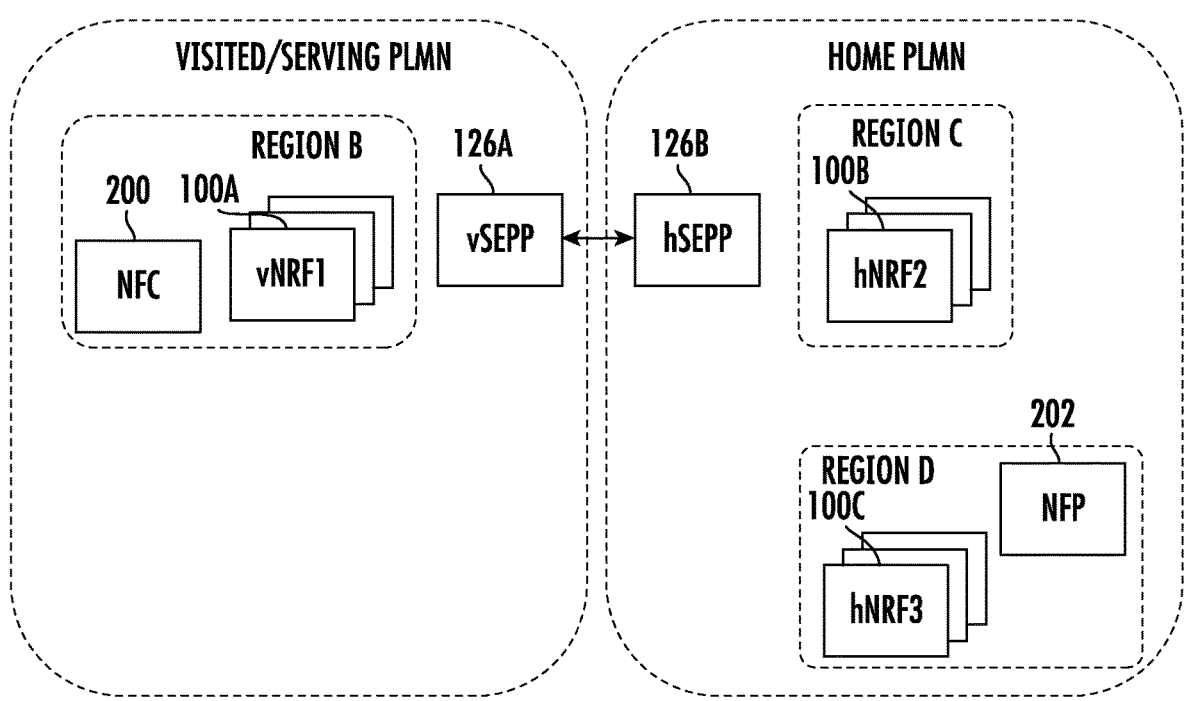
FIG. 2 is a network diagram illustrating an exemplary geo-redundant NRF deployment.

FIG. 2 is a network diagram illustrating an example of a geo-redundant NRF deployment. in FIG. 2, a visited PLMN includes one region, region B with visited NRF (vNRF) 100A and consumer NF 200. A visited SEPP 126A forwards traffic from the visited PLMN to the home PLMN and vice versa. The home PLMN includes two regions, region C and region D. Each region includes multiple NRFs that share data with other NRFs in the same region. In the illustrated example, region C includes NRFs 100B. Region D includes NRFs 100C. Region D also includes producer NF 202. An SEPP 126B forwards traffic from the visited PLMN to the home PLMN and vice versa. It should be noted that NRFs in different regions do not share data with each other. For example, NRFs 100B in region C do not share data with NRFs 100C located in region D. If a given NRF is not able to handle an Nnrf service request, the NRF in the region shall forward the service request to another NRF in the same PLMN but in a different region using the 3G PP-defined intermediate forwarding procedure.

Figure 3:
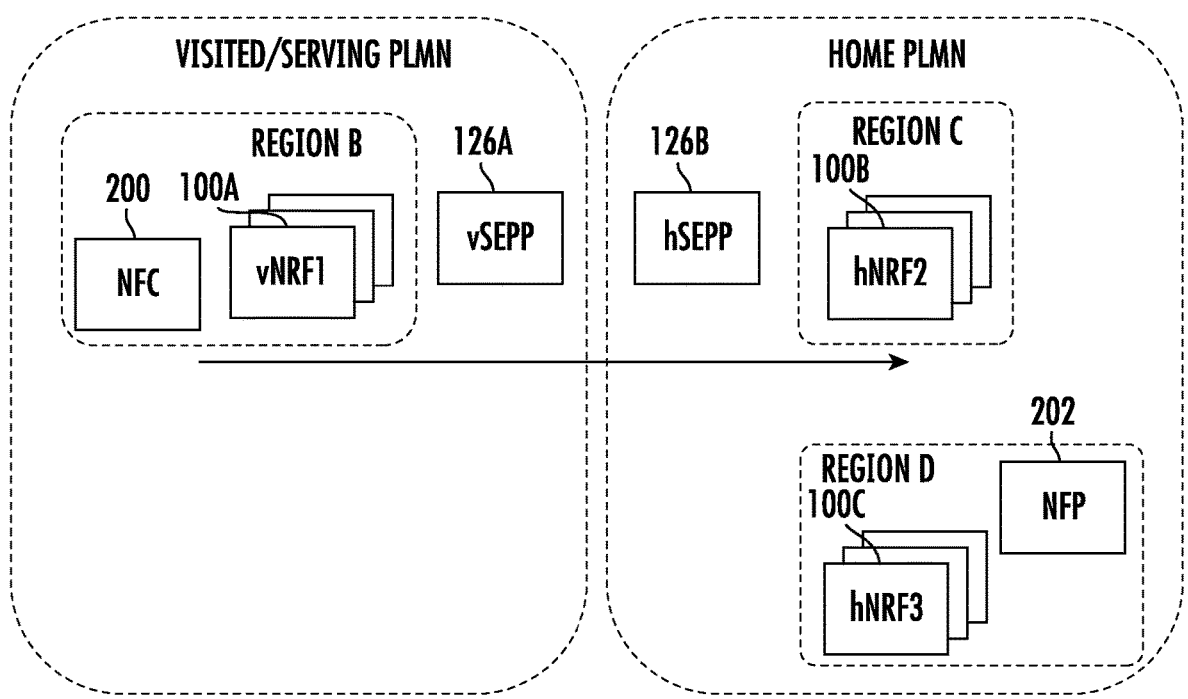
FIG. 3 is a network diagram illustrating inter-PLMN subscription creation.

FIG. 3 is a network diagram illustrating inter-PLMN subscription creation.

For any inter-PLMN subscription request, consumer NF 200 sends the subscription request to locally configured visited NRF (vNRF) 100A, with the required conditional attributes in the request. vNRF 100A constructs a 3gpp-Sbi-Target-apiRoot header with a self-constructed fully qualified domain name (FQDN) in the inter-PLMN format and forwards the request to vSEPP 126A. vSEPP 126A forwards the request to hSEPP 126B. hSEPP 126B forwards the subscription creation request to hNRF 100B. hNRF 100B may be the default NRF configured to receive inter-PLMN subscription requests for Nnrf services. However, as will be described in detail below, if hNRF 100B is unable to process an inter-PLMN subscription request, hNRF 100B may forward the subscription creation request to another NRF in a different region using intermediate forwarding.

Figure 4:
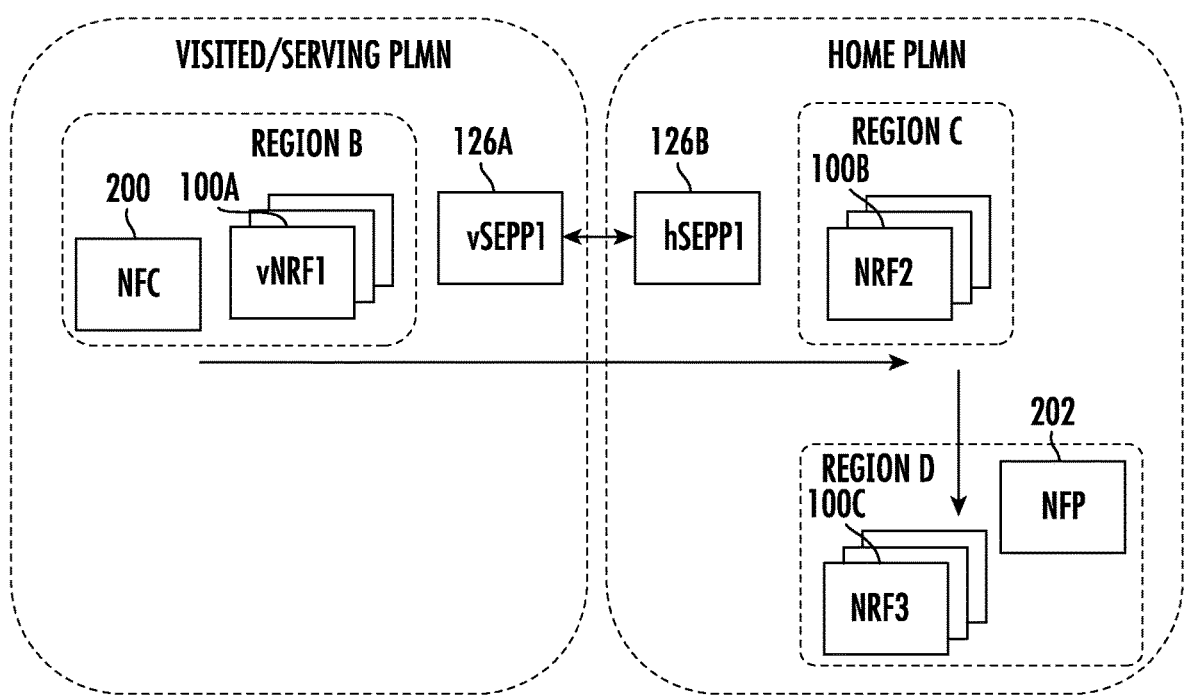
FIG. 4 is a network diagram illustrating inter-PLMN subscription creation with intermediate NRF forwarding.

FIG. 4 is a diagram illustrating intermediate forwarding of an inter-PLMN subscription creation request. Referring to FIG. 4, after the request reaches hSEPP 126B, the routing of the inter-PLMN Nnrf service request is based on local configuration. In the illustrated example, as in FIG. 3, hSEPP 126B may forward the inter-PLMN subscription creation request to hNRF 100B. If the hNRF 100B is unable to process the subscription creation request (e.g., because the producer NF whose information is being subscribed to is registered with an NRF in a different region from hNRF 100B), then hNRF 100B performs intermediate forwarding of the subscription creation request to NRF 100C of region D, as defined in 3GPP TS 29.510, Section 5.2.2.5.4. More than one hop of intermediate forwarding may be performed until the subscription creation request is received by the NRF with which the producer NF whose information is being sought is registered.

Figure 5:
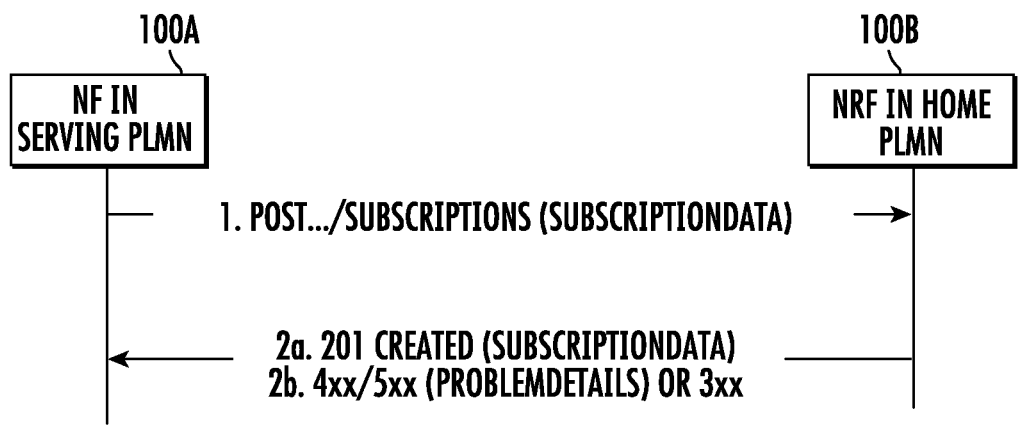
FIG. 5 is a message flow diagram illustrating exemplary messages exchanged for creating a subscription to an NF instance in a different PLMN.

FIG. 5 is a message flow diagram illustrating exemplary messages exchanged as per 3GPP TS 29.510, section 5.2.2.5.3 for creating a subscription to an NF instance in a different PLMN. Referring to FIG. 5, in line 1 of the message flow, NRF 100A in the serving PLMN sends an HTTP POST (subscription creation) request to the resource uniform resource identifier (URI) in NRF 100B in the home PLMN representing the "subscriptions" collection resource. In line 2 of the message flow diagram, NRF 100B sends a response to the subscription creation request to NRF 100A. On success, NRF 100B returns a 201 Created response including a subscription identifier for identifying the subscription. The NRF in Serving PLMN (vNRF 100A) should not keep state for this created subscription and sends to the NF service consumer in the serving PLMN a subscriptionID that consists of the following structure: <MCC>+<MNC>+ "-"+<OriginalSubscriptionID>. The URI in the location header that the NRF in serving PLMN returns to the NF service consumer in the serving PLMN contains a <subscriptionId> modified as described above and, if it is as an absolute URI, an apiRoot pointing to the address of the NRF in serving PLMN. Thus, in FIG. 5, the apiRoot in the subscription response returned to the NF service consumer will be that of NRF 100A rather than NRF 100B. One point to highlight is that the location header with the target NRF apiRoot (home PLMN) is lost, which makes routing of subsequent messages relating to the existing subscription a challenge.

Figure 6:
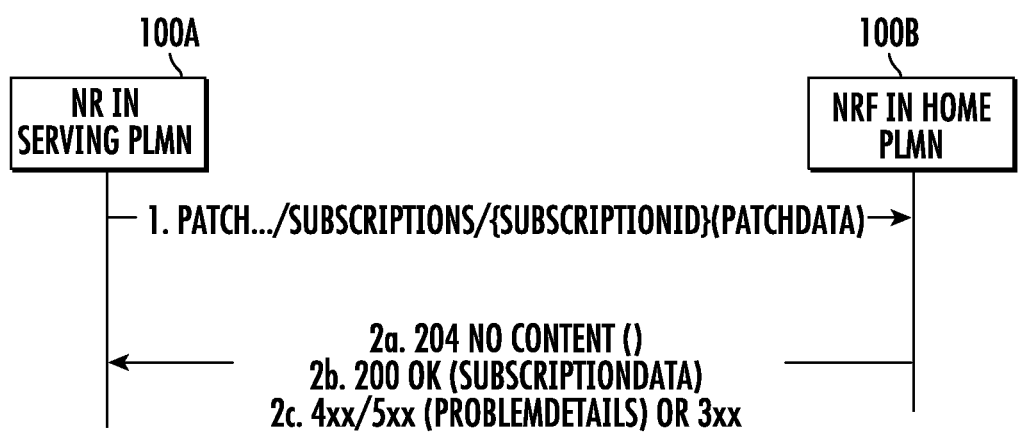
FIG. 6 is a message flow diagram illustrating exemplary messages exchanged for updating a subscription to an NF instance in a different PLMN.

FIG. 6 is a message flow diagram illustrating exemplary messages exchanged for an update to a subscription in a different PLMN. Referring to FIG. 6, in line 1, NRF 100A located in the serving network (vPLMN) sends an HTTP PATCH request identifying an existing subscription to NRF 100B located in the home PLMN. 3GPP TS 29.510, Section 5.2.2.5.7, states that the update of a subscription in a different PLMN is performed by updating a subscription resource identified by a "subscription ID". The request for updating a subscription includes the identity of the PLMN of the home NRF (MCC/MNC values) as a leading prefix of the subscriptionID, which was inserted in the 201 Created message sent in response to the subscription creation request. One point to highlight is that as per section 28.3.2.3.2 of 3GPP TS 23.003, the NRF in the visited PLMN self-constructs the NRF FQDN of target NRF in the home PLMN, and the self-constructed FQDN will be the same for a given home PLMN, even when there are multiple PLMN-level NRFs deployed in the home PLMN. For example, according to Section 28.3.2.3.2 and 28.3.2.3.3 of 3GPP TS 23.003, the API root for NRF services self-constructed by the vNRF shall be:

https://nrf.5gc.nid<NID>.mnc<MNC>.mcc<MCC>0.3gppnetwork.org

There is no means for the NRF in the visited PLMN to identify the specific target NRF in the home network on which a subscription resides. The self-constructed is the same for any inter-PLMN service request for creating or updating a subscription for an Nnrf service, even when there are multiple NRFs in the home network. The SEPP in the home network may forward such inter-PLMN Nnrf service requests to an NRF by default, but that NRF may not be the NRF that created the subscription. Thus, if the home NRF is unable to process or forward the subscription update request, the NRF may return a 4xx or 5xx error message to the NRF in the serving PLMN.

Figure 7:
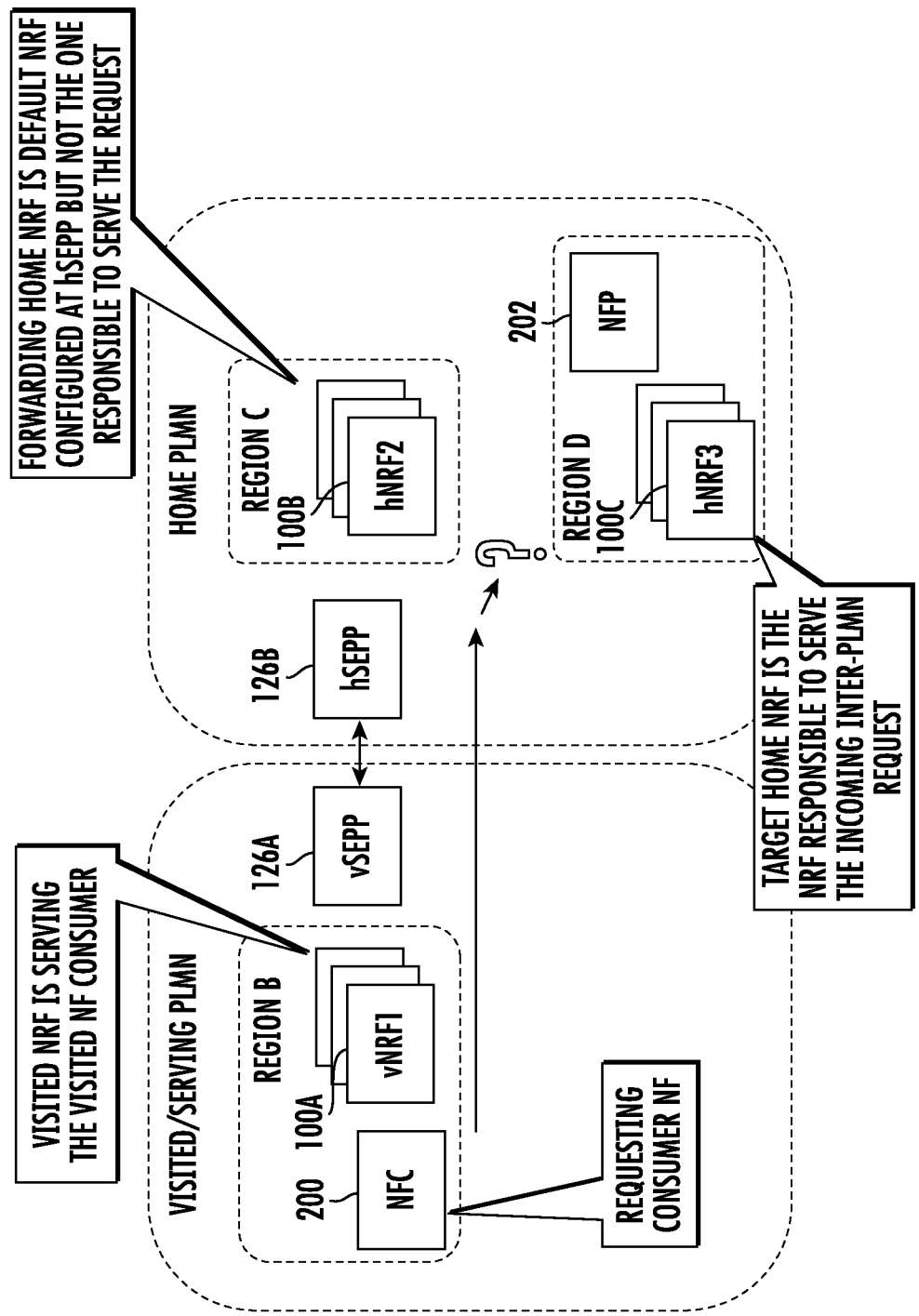
FIG. 7 is a network diagram illustrating a problem with routing inter-PLMN messages associated with existing subscriptions.

FIG. 7 is a network diagram illustrating the problem with routing inter-PLMN messages relating to existing subscriptions. Referring to FIG. 7, NF consumer 200 located in the visited or serving PLMN is assumed to have created a subscription with NRF 100C located in the home PLMN. When NF consumer 200 sends a message to update the subscription, NF consumer 200 sends the message to visited NRF 100A. Visited NRF 100A self-constructs the FQDN of the home NRF using the format described above. Visited NRF 100A forwards the message to the home PLMN based on the MCC+MNC value in the self-constructed FQDN. Based on the 3gpp-sbi-target-apiRoot header, which contains the above-described self-constructed FQDN, vSEPP 126A forwards the request to hSEPP 126B. hSEPP 126B has no mechanism to route the request to NRF 100C in region D which was responsible for creating the subscription resource. Instead, hSEPP 126B may route the request to NRF 100B by default, which will result in an error response because the subscription does not reside on NRF 1008.

Figure 8:
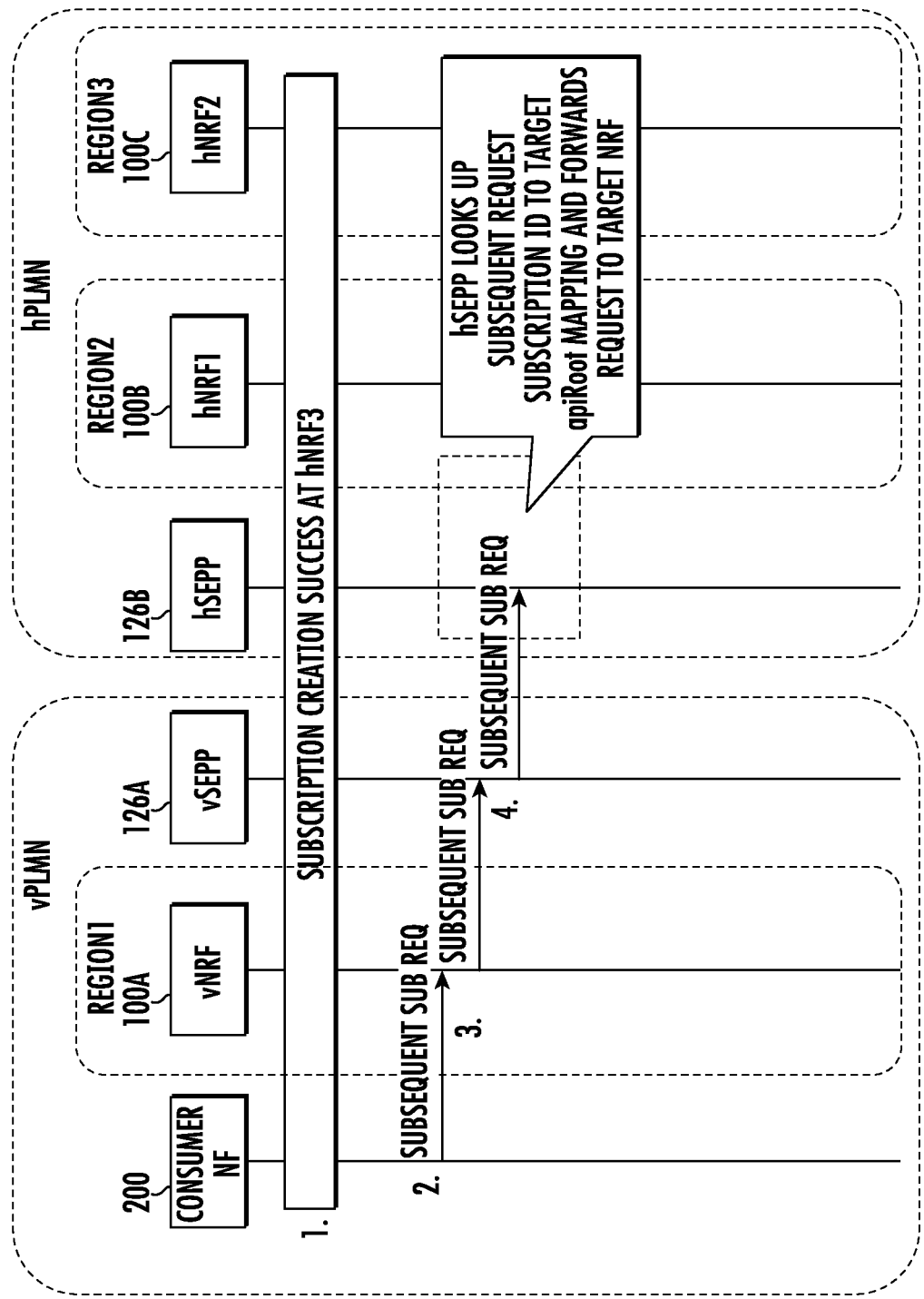
FIG. 8 is a message flow diagram further illustrating the problem with routing inter-PLMN messages associated with existing subscriptions.

FIG. 8 is a message flow illustrating exemplary routing of inter-PLMN messages relating to an existing subscription with an NRF where intermediate forwarding is implemented. Referring to FIG. 8, in line 1, consumer NF 200 in the visited PLMN creates an inter-PLMN subscription with hNRF 100C located in the home PLMN. hNRF 100C receives the initial subscription creation request from hNRF 100B via intermediate forwarding. hNRF 100C sends a success response to consumer NF 200, but vNRF 100A modifies the location header in the success response to replace the target apiRoot identifying hNRF 100C with the target apiRoot identifying vNRF 100A.

In line 2, consumer NF 200 sends a message for updating or deleting the existing subscription to vNRF 100A. vNRF 100A identifies the message as requiring service by an NRF in a different PLMN and self-constructs the inter-PLMN NRF FQDN using the format described above. The inter-PLMN NRF FQDN does not include an identifier for hNRF 100C. In line 3, vNRF 100A forwards the message to vSEPP 126A. In line 4, vSEPP 126A forwards the message to hSEPP 1268. hSEPP 1268 does not have the information to route the message to target NRF 100C in region 3. Accordingly, hSEPP 126B may forward the request to hNRF 100B by default, and hNRF 100B is unable to process the message because the subscription is located on a different NRF.

In order to avoid the difficulties described above with routing of inter-PLMN messages relating to existing subscriptions with an NRF, the hSEPP maintains a mapping between subscriptionID and target NRF apiRoot. On successful subscription creation, the target NRF generates a unique subscriptionID. In the response indicating successful creation of a subscription, the target NRF includes a location header with the resource URI containing the target NRF apiRoot that identifies the resource for the subscription created on the target NRF. The hSEPP receives the response, reads the target NRF apiRoot and the subscription ID from the response, creates a mapping between the subscriptionID and the target NRF's apiRoot, and stores the mapping in a subscription ID to target NRF resource identification information database local to the hSEPP. For any incoming subsequent subscription requests relating to existing subscriptions, the hSEPP performs a lookup in the subscriptionID to target NRF resource identification information database using the subscriptionID from the incoming subscription request, locates the target NRF's apiRoot, and routes the request to the NRF corresponding to the target NRF's apiRoot.

Figure 9:
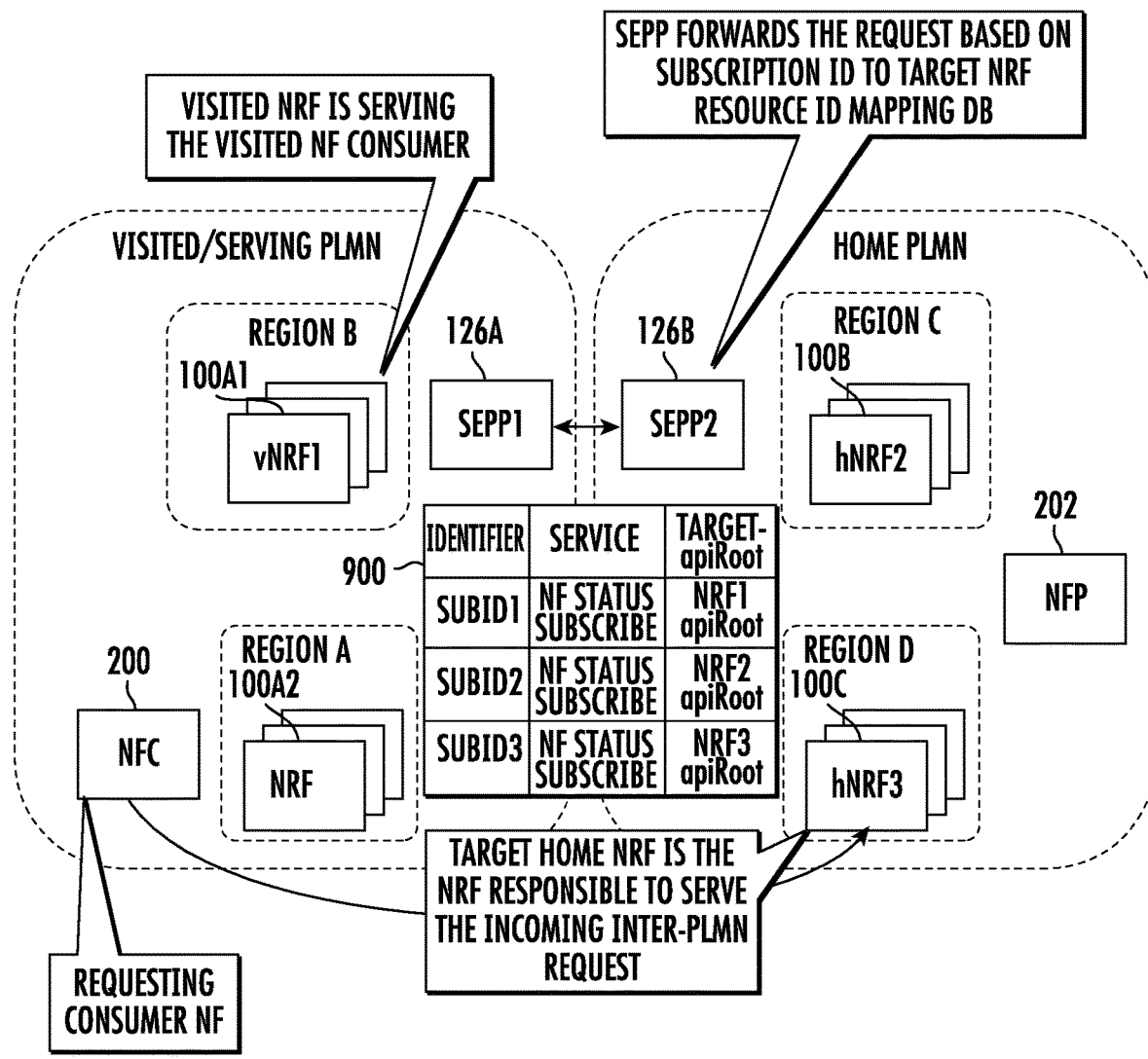
FIG. 9 is a network diagram illustrating an SEPP that stores mapping information for mapping subscription identification information to target NRF resource identifiers and using the mapping information to route inter-PLMN messages associated with existing subscriptions.

FIG. 9 is a network diagram illustrating the use of an SEPP to create and use mappings between subscription identifiers and target apiRoot information and the use of the mappings to route inter-PLMN messages relating to existing subscriptions with NRFs. Referring to FIG. 9, the visited network includes NRFs 100A1 and 100A2 located in different regions, and the home network includes NRFs 100B and 100C located in different regions. It is assumed that consumer NF 200 served by vNRF 100A1 seeks to subscribe to receive updates regarding producer NF 202, which is registered with NRF 100C in region D of the home network. Accordingly, consumer NF 200 located in the visited network creates a subscription with NRF 100C located in the home network by sending a subscription creation request to vNRF 100A1. vNRF 100A1 self-constructs the inter-PLMN FQDN and forwards the subscription creation request to vSEPP 126A. vSEPP 126A forwards the subscription creation request to hSEPP 126B. hSEPP 126B forwards the subscription creation request to hNRF 100B by default. hNRF 100B forwards the subscription creation request to hNRF 100C via intermediate forwarding.

NRF 100C sends a response to the subscription creation request including a subscription identifier for identifying the subscription and an apiRoot attribute identifying NRF 100C.

NRF 100C sends the response to SEPP 126B. SEPP 126B, receives the response, reads the subscription ID and the apiRoot attribute from the response, and creates an entry or record in a subscriptionID to target NRF resource identification information mapping database 900 local to SEPP 126B. When SEPP 126B receives a message from SEPP 126A for updating a subscription (identifiable by the HTTP method, such as PATCH), SEPP 126B reads the subscriptionID from the message and performs a lookup in subscriptionID to target NRF resource identification information mapping database 900 using the subscription ID from the message. SEPP 126B reads the value of the apiRoot attribute from the corresponding database record or entry and routes the message to the NRF corresponding to the apiRoot, which in FIG. 9 is NRF 100C located in region D. It should be noted that the inter-PLMN message for updating or deleting the subscription may contain the self-constructed inter-PLMN NRF FQDN created by vSEPP 100A. The message does not include the apiRoot of the target NRF 100C. However, because hSEPP 126B maintains the mapping between the subscription identifier and the target NRF apiRoot, hSEPP 126B is able to route the inter-PLMN message for updating or deleting the subscription to the target NRF that created the subscription.

Figure 10:
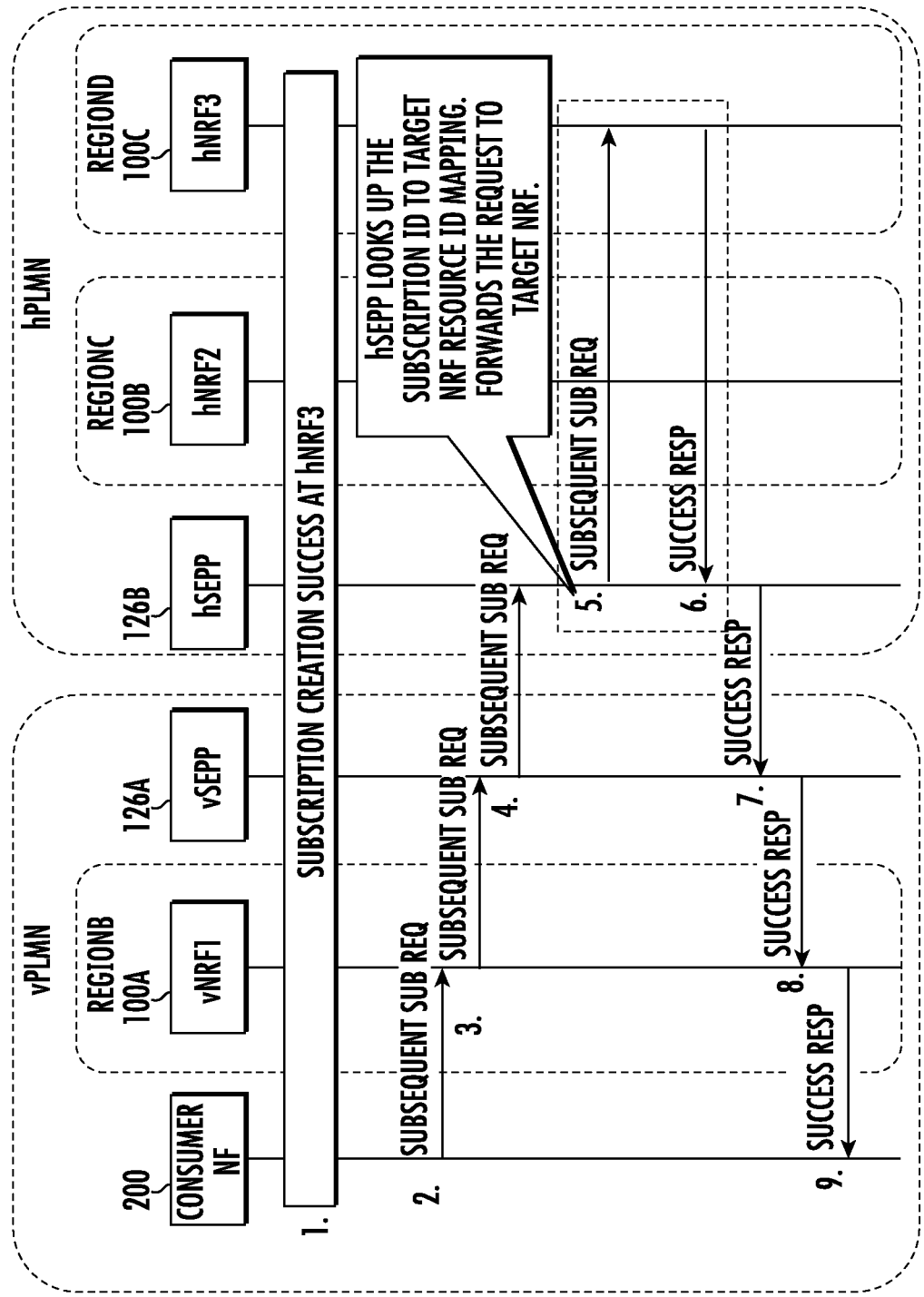
FIG. 10 is a message flow diagram illustrating exemplary messages exchanged for using mapping information stored by an SEPP to route inter-PLMN messages associated with existing subscriptions.

FIG. 10 is a message flow diagram illustrating exemplary messages exchanged in using stored mappings between subscription identifiers and target apiRoot information to route inter-PLMN messages relating to existing subscriptions. Referring to FIG. 10, in line 1, consumer NF 200 sends a request to create a subscription with an NRF in the home PLMN. The subscription creation request is initially forwarded to hNRF 100B. hNRF 100B determines that it is not able to create the subscription, e.g., because the producer NF whose status is being subscribed to is not registered with hNRF 100B, and hNRF 100B forwards the subscription creation request to another NRF in the home PLMN, which in this example, is hNRF 100C located in region D. hNRF 100D determines that it is able to create the requested subscription, creates the subscription and generates and transmits a success response (a 201 Created message) including a subscriptionID identifying the subscription and a location header containing the target apiRoot attribute identifying NRF 100C. hNRF 100C forwards the 201 Created message to hSEPP 126B. hSEPP 126B receives the 201 Created message, reads the subscriptionID and the target apiRoot attribute values in the message, and creates a record or entry in database 900 mapping the subscription ID to the target apiRoot attribute value. hSEPP 126B forwards the 201 Created message to vNRF1 100A, which modifies the location header to remove the target apiRoot identifying NRF 100C and adding an MCC and MNC as a prefix to the subscription ID. vNRF 100A forwards the response to consumer NF 200.

In line 2, consumer NF 200 generates and sends a message for updating the subscription with NRF 100C. The message may be a message for updating or deleting the subscription. The message includes the subscription ID prefixed with the MCC and MNC. Consumer NF 200 sends the message to vNRF 100A. vNRF 100A receives the message, identifies the message as an inter-PLMN message by the MCC and MNC prefix, and, in line 3 forwards the message to vSEPP 126A. In line 4, vSEPP 126A forwards the message to hSEPP 126B.

hSEPP 126B receives the message, and identifies, based on the HTTP method type (e.g., that the message contains an HTTP PATCH method type), that the message is a message for updating or deleting an existing subscription. hSEPP 126B reads the subscription ID from the message and performs a lookup in subscriptionID to target NRF resource identification information mapping database 900 to identify a target apiRoot identifying the NRF to which the message is directed. In this example, hSEPP 126B locates the record corresponding to the target apiRoot of hNRF 100C and, in line 5, forwards the message to hNRF 100C. hNRF 100C receives the message, processes the message to update or delete the subscription, and, in line 6, sends a success response to hSEPP 126B. In line 7, hSEPP 126B sends the success response to vSEPP 126A. In line 8, vSEPP 126A sends the success response to vNRF 100A. In line 9, vNRF 100A sends the success response message to consumer NF 200. Thus, the message flow in FIG. 9 illustrates successful routing of an inter-PLMN message for updating or deleting an existing subscription using stored mapping information at the home network SEPP.

Table 1 below illustrates exemplary mapping information that SEPP 126B may create and store in subscriptionID to target NRF resource identification mapping database.

TABLE 1

SubscriptionID to Target NRF Resource
Identification Information Mappings

| Subscription Identifier | Service | Target-apiRoot |
|---|---|---|
| SubID1 | NfStatusSubscribe | NRF1 apiRoot |
| SubID2 | NfStatusSubscribe | NRF2 apiRoot |
| SubID3 | NfStatusSubscribe | NRF3 apiRoot |

In Table 1, the first column includes the subscription identifier which is read from the 201 Created message for creating each subscription. The second column includes an identifier for the service type, which may also be read from the 201 Created message. The third column includes that target apiRoot, which may also be read from the 201 Created message and which identifies the target NRF. Mapping data such as that illustrated in Table 1 may be stored in memory of and/or accessible to hSEPP 126B.

Figure 11:
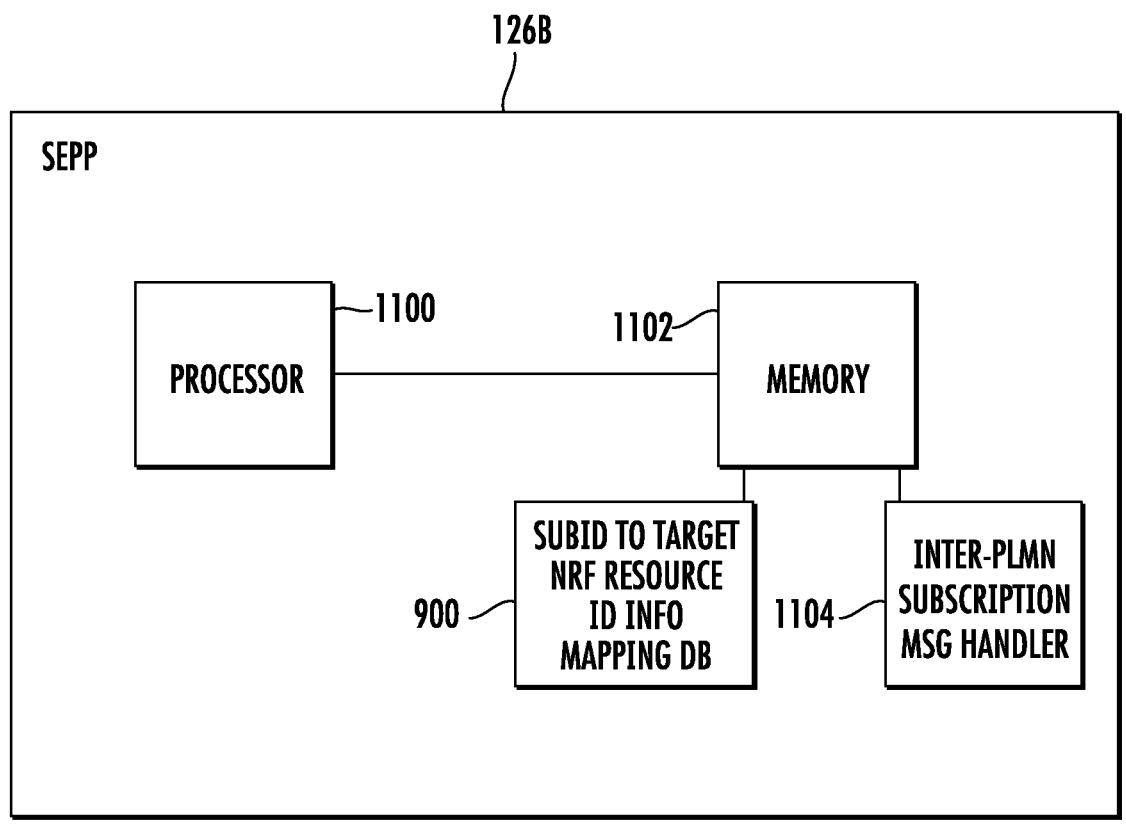
FIG. 11 is a block diagram illustrating an SEPP for creating mappings between subscription identification information and target NRF resource identification information and using the mappings to route inter-PLMN messages associated with existing subscriptions.

FIG. 11 is a block diagram illustrating an exemplary architecture for an SEPP for creating mappings between subscription identifiers and target apiRoot information and using the mappings to route messages associated with existing subscriptions. Referring to FIG. 11, SEPP 126B includes at least one processor 1100 and a memory 1102. SEPP 126B further includes subscriptionID to target NRF resource identification information mapping database 900 which stores mappings between subscriptionID values and target NRF resource identification information, such as apiRoot attribute values identifying target NRFs. SEPP 126B further includes an inter-PLMN subscription message handler 1104 that receives and processes inter-PLMN subscription responses to create and store mappings in database 900. Inter-PLMN subscription message handler 1104 may also process inter-PLMN requests for updating or deleting subscriptions by accessing database 900 to identify the target resource for each request and for forwarding the inter-PLMN requests to the NRF on which the subscriptions reside. Inter-PLMN subscription message handler 1104 may be implemented using computer executable instructions stored in memory 1102 and executed by processor 1100.

Figure 12:
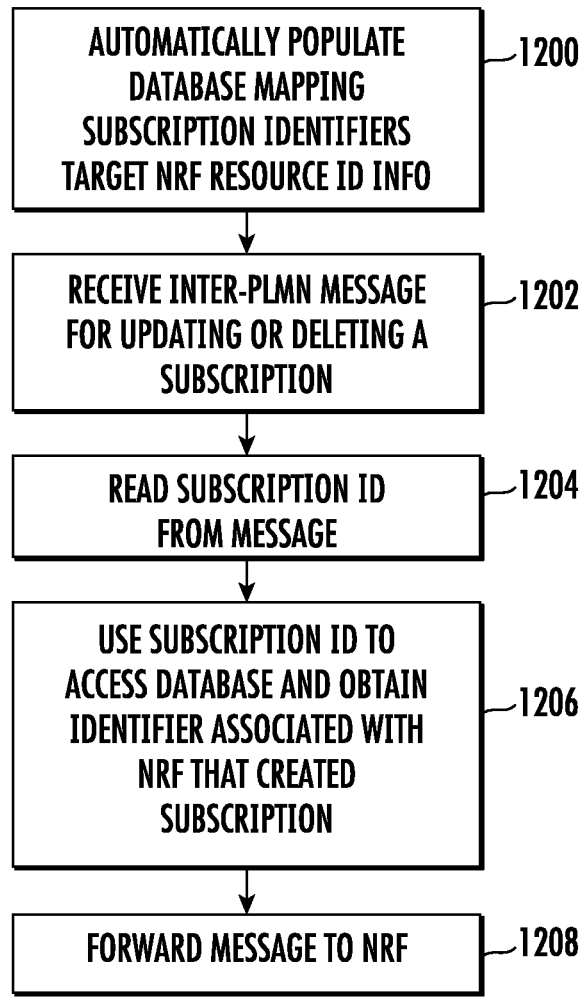
FIG. 12 is a flow chart illustrating an exemplary process performed by an SEPP for creating mappings between subscription identification information and target NRF resource identification information and using the mappings to route inter-PLMN messages associated with existing subscriptions.

FIG. 12 is a flow chart illustrating an exemplary process for using an SEPP to create and store mappings between subscription identifiers and target apiRoot information and for using the mappings to route inter-PLMN messages relating to existing subscriptions. Referring to FIG. 12, in step 1200, the process includes automatically populating, by the SEPP, a subscription identifier to target NRF resource identification information mapping database accessible to the SEPP with mappings between subscription identifiers and target NRF resource identification information. For example, SEPP 126B may receive an Nnrf status subscribe message for creating a subscription with an NRF in the PLMN of SEPP 126B. SEPP 126B may forward the inter-PLMN subscription request message to an NRF of a plurality of NRFs in the PLMN of the SEPP. For example, SEPP 126B may forward the message to NRF 100B based on NRF 100B being the default NRF configured to receive inter-PLMN subscription creation requests. To create a record in the subscription identifier to target NRF resource identification information database 900, SEPP 126B may receive a subscription response message indicating successful creation of the subscription with an NRF in the PLMN of SEPP 126B. The NRF that sends the subscription response message may be a different NRF from the NRF to which SEPP 126B forwarded the subscription creation message. For example, SEPP 126B may receive a 201 Created message from NRF 100C indicating that the subscription has been created on NRF 100C. SEPP 126B may read, from the subscription response, a subscription identifier and an identifier associated with the NRF and store a mapping between the subscription identifier and the identifier associated with the NRF that created the subscription. For example, SEPP 126B may read the subscriptionID and the apiRoot of NRF 100C from the 201 Created message and create an entry in database 900 mapping the subscriptionID to the apiRoot of NRF 100C.

In step 1202, the process includes receiving an inter-PLMN message for updating or deleting a subscription. For example, SEPP 126B may receive a message with an HTTP PATCH method type for modifying an existing subscription identified by the subscription ID in the message. The message may include the self-constructed FQDN created by vNRF 100A, which does not include the apiRoot of the target NRF that created the subscription.

In step 1204, the process includes, rather than attempting to route the message using the self-constructed inter-PLMN NRF FQDN, reading a subscription identifier from the message for modifying or deleting the subscription. For example, SEPP 126B may read the subscriptionID from the message for updating or deleting the subscription.

In step 1206, the process includes using the subscription identifier from the message for modifying or deleting the subscription to access the database and obtain the identifier associated with the NRF that created the subscription. For example, SEPP 126B may perform a lookup in database 900 using the subscription identifier from the message for updating or deleting the subscription, locate a corresponding record, and read the target apiRoot identifying NRF 100C from the record.

In step 1208 the process includes forwarding the message for updating or deleting the subscription to the NRF. For example, SEPP 126B may forward the message to the NRF identified by the target apiRoot information extracted from the database rather than using the inter-PLMN NRF FQDN constructed by vNRF 100A.

Exemplary advantages of the subject matter described herein include providing a mechanism for routing inter-PLMN messages relating to existing subscriptions. The subject matter described herein can be used to route any inter-PLMN messages associated with an existing subscription, including messages for updating a subscription or unsubscribing to or deleting a subscription. The subject matter described herein can be used to route inter-PLMN messages relating to existing subscriptions from any consumer NF type for subscriptions regarding the status of any producer NF type. Examples of such consumer and producer NF types include any of the NF types illustrated in FIG. 1.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 17) 3GPP TS 29.510 V17.1.0 (2021-03).
2. $3^{rd}$ Generation Partnership Project; Technical Specification Group Core Network and Terminals; Numbering, addressing and identification (Release 17) 3GPP TS 23.003 V17.3.0 (2021-09).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing inter-public land mobile network (inter-PLMN) messages relating to existing subscriptions with network function (NF) repository function (NRFs), the method comprising:
    at a security edge protection proxy (SEPP) implemented using at least one processor:
        automatically populating, by the SEPP, a subscription identifier to target NRF resource identification information mapping database accessible to the SEPP with mappings between subscription identifiers and target NRF resource identification information;
        receiving an inter-PLMN message for modifying or deleting a subscription;
        reading a subscription identifier from the message for modifying or deleting the subscription;
        using the subscription identifier from the message for modifying or deleting the subscription to access the database and obtain an identifier associated with an NRF that created the subscription; and
        forwarding the message for updating or deleting the subscription to the NRF.

2. The method of claim 1 wherein automatically populating the subscription identifier to target NRF resource identification information mapping database includes:
    receiving, from the NRF, a subscription creation response message indicating successful creation of the subscription; and
    reading, from the subscription creation response message, the subscription identifier and the identifier associated with the NRF and storing, in the database, a mapping between the subscription identifier and the identifier associated with the NRF.

3. The method of claim 2 wherein the identifier associated with the NRF comprises a target apiRoot attribute identifying the NRF.

4. The method of claim 3 wherein reading, from the subscription creation response message, the subscription identifier and the identifier associated with an NRF includes reading the target apiRoot attribute from a location header of the subscription creation response message.

5. The method of claim 2 wherein receiving the subscription creation response message includes receiving a 201 Created message indicating successful creation of the subscription.

6. The method of claim 2 wherein receiving the subscription creation response message includes receiving the subscription creation response message from an NRF that is a different NRF to which the SEPP sent a corresponding subscription creation request message.

7. The method of claim 6 wherein receiving the subscription creation response message from the NRF that is different from the NRF to which the SEPP sent the corresponding subscription creation request message includes receiving the subscription creation response message from an NRF that received the corresponding subscription request message via intermediate forwarding.

8. The method of claim 1 wherein receiving the inter-PLMN message for updating or deleting the subscription includes receiving a hypertext transfer protocol (HTTP) PATCH request for updating or deleting the subscription.

9. The method of claim 8 comprising identifying the inter-PLMN message for updating or deleting the subscription as a message for updating or deleting the subscription based on an HTTP method type of the message for updating or deleting the subscription.

10. The method of claim 1 wherein the message for updating or deleting the subscription includes receiving a message including an inter-PLMN NRF fully qualified domain name (FQDN) constructed by a visited NRF and wherein forwarding the message incudes forwarding the message using the identifier for the NRF obtained from the database rather than the inter-PLMN NRF FQDN constructed by the visited NRF.

11. A system for routing inter-public land mobile network (inter-PLMN) messages relating to existing subscriptions with a network function (NF) repository functions (NRFs), the system comprising:
a security edge protection proxy (SEPP) including at least one processor and a memory; and
an inter-PLMN subscription message hander implemented by the at least one processor for automatically populating a subscription identifier to target NRF resource identification information mapping database accessible to the SEPP and including mappings between subscription identifiers and target NRF resource identification information, storing the database in the memory, receiving an inter-PLMN message for modifying or deleting a subscription, reading a subscription identifier from the message for modifying or deleting the subscription, using the subscription identifier from the message for modifying or deleting the subscription to access the database and obtain an identifier associated with an NRF that created the subscription, and forwarding the message for updating or deleting the subscription to the NRF.

12. The system of claim 11 wherein the inter-PLMN subscription message handler is configured to, in automatically populating the subscription identifier to target NRF resource identification information mapping database:

receive, from the NRF, a subscription creation response message indicating successful creation of the subscription; and
read, from the subscription creation response message, the subscription identifier and the identifier associated with the NRF and storing, in the database, a mapping between the subscription identifier and the identifier associated with the NRF.

13. The system of claim 12 wherein the identifier associated with the NRF comprises a target apiRoot attribute identifying the NRF.

14. The system of claim 13 wherein the inter-PLMN subscription message handler is configured to read the target apiRoot attribute from a location header of the subscription creation response message.

15. The system of claim 12 wherein the subscription creation response message includes a 201 Created message indicating successful creation of the subscription.

16. The system of claim 12 wherein the subscription creation response message is received from an NRF that is a different NRF to which the SEPP sent a corresponding subscription creation request message.

17. The system of claim 16 wherein the subscription creation response message is received from an NRF that received the corresponding subscription creation request message via intermediate forwarding.

18. The system of claim 11 wherein the inter-PLMN message for updating or deleting the subscription includes a hypertext transfer protocol (HTTP) PATCH request for updating or deleting the subscription.

19. The system of claim 18 wherein the inter-PLMN subscription message handler is configured to identify the inter-PLMN message for updating or deleting the subscription as a message for updating or deleting the subscription based on an HTTP method type of the message for updating or deleting the subscription.

20. A non-transitory computer readable medium having stored thereon executable instructions that when executed by a processor of a computer control the computer to perform steps comprising:
at a security edge protection proxy (SEPP):
automatically populating, by the SEPP, a subscription identifier to target network function (NF) repository function (NRF) resource identification information mapping database accessible to the SEPP with mappings between subscription identifiers and target NRF resource identification information;
receiving an inter-PLMN message for modifying or deleting a subscription;
reading a subscription identifier from the message for modifying or deleting the subscription;
using the subscription identifier from the message for modifying or deleting the subscription to access the database and obtain an identifier associated with an NRF that created the subscription; and
forwarding the message for updating or deleting the subscription to the NRF.

\* \* \* \* \*